United States Patent Office 2,867,847
Patented Jan. 13, 1959

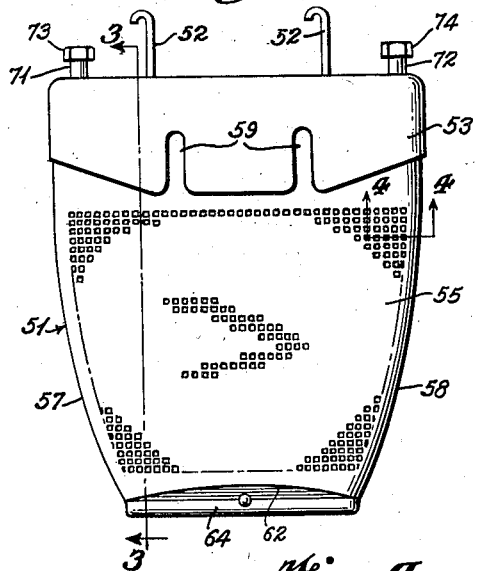
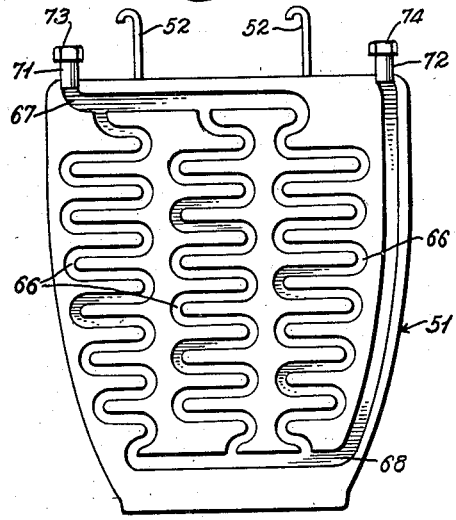
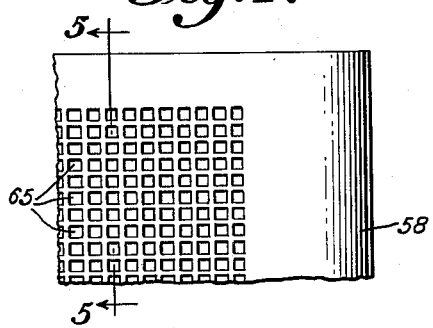
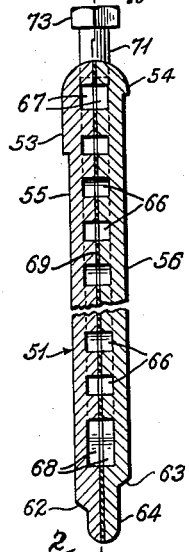
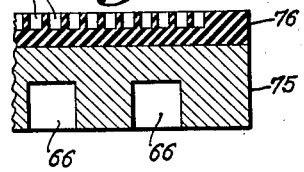

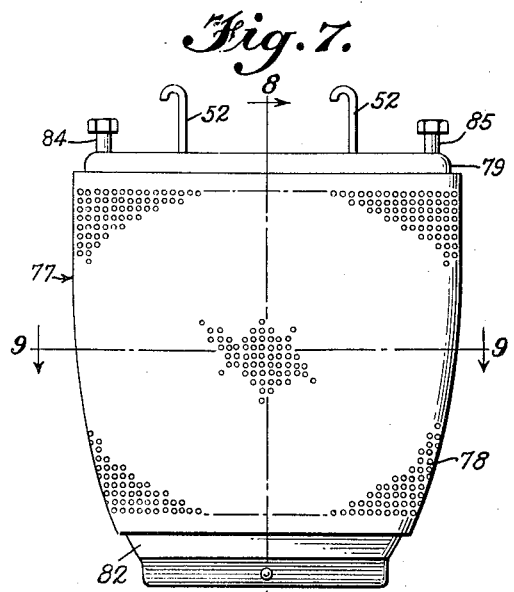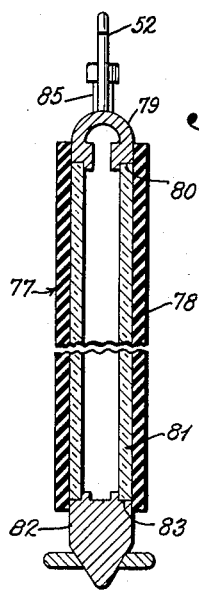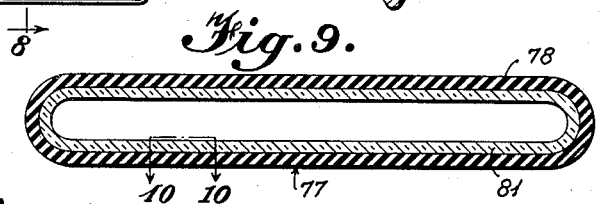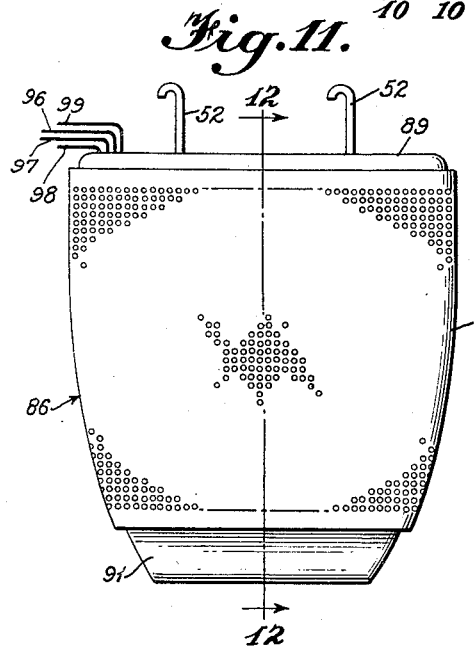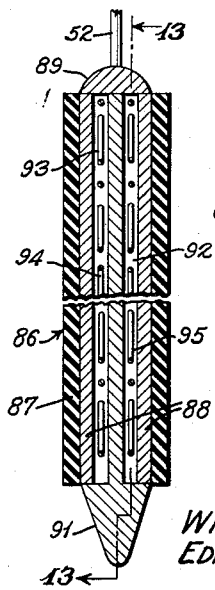

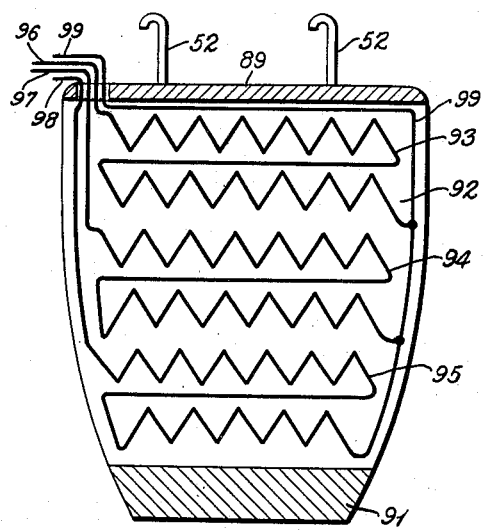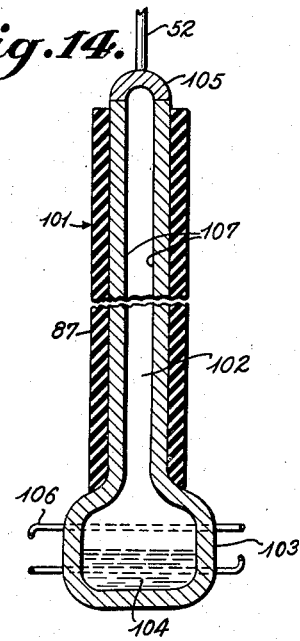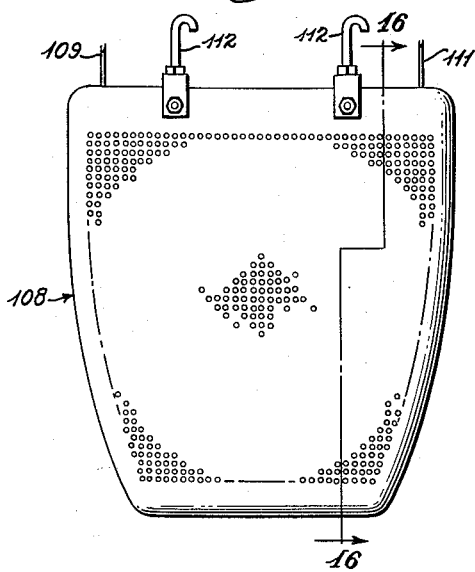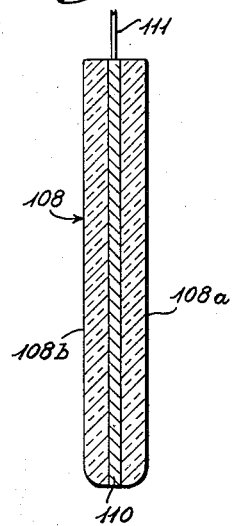

2,867,847

FORMS FOR MANUFACTURE OF DEPOSITED LATEX ARTICLES

Wilbur A. Miller and Edwin B. Gienger, Jr., Dover, Del., assignors to International Latex Corporation, Dover, Del., a corporation of Delaware Application April 22, 1953, Serial No. 350,342

19 Claims. (Cl. 18—41)

This invention relates to improvements in the construction and use of forms for making porous sheath-like deposited latex articles, such articles being typically adapted for use as sheaths or envelopes for restraining, protecting or shaping a portion of the human body. A major use of such sheaths has been as rubber girdles, panties and similar undergarments which are economically made from aqueous dispersions of natural rubber or other elastomers, such dispersions being commonly referred to as rubber latex. Because of the public's familiarity with rubber latex girdles, the present invention will be described as applied thereto. However, those skilled in the art will understand how the invention can be employed in the manufacture of other rubber articles.

Rubber latex girdles, as originally disclosed in U. S. Patent 2,360,736, issued October 17, 1944 to A. N. Spanel, have been satisfactory products, as proven by customer acceptance, and have been made additionally attractive to the consuming public by many worthwhile improvements. However, attempts to increase the porosity of such girdles have not been heretofore successful even though those skilled in the art have known how to prepare perforate rubber sheeting of various types; apparently no feasible method has been found to incorporate such sheeting in an enveloping sheath without producing either a weak article or one which has seams that are uncomfortable. The measure of the success in solving this problem can be judged by the fact that no dipped latex girdles having extensive porosity have ever been marketed, in spite of the very obvious sales appeal of such an article.

The present invention overcomes the obstacles apparently found unsurmountable by previous workers in the field and, in general, provides forms for producing deposited latex articles such as a seamless, peripherally complete sheath, especially one which is worn in a stretched condition such as a girdle or similar undergarment, in which a sufficient portion of the body of the sheath is pervious or porous as to provide for adequate escape of perspiration, even in hot weather. Such porosity is achieved by the use of a form which effects the generation of a multitude of closely spaced, straight pores communicating with both surfaces of the deposited latex film and formed during the manufacture of the article, as described more fully hereinafter.

In general, such sheaths are generated by dipping in a bath of rubber latex a rigid dipping form of appropriate contour comprising a rigid backing, a peripherally complete article generating surface in which there are pores bridgeable by rubber latex, and means to force gas through said pores; removing the dipping form from said bath under conditions, including rate of removal, such that the form is covered by a continuous film of liquid latex (i. e., with substantially all of said pores bridged by films of latex); and creating a multitude of pores in the film of latex by forcing gas out of substantially all of the pores of the dipping form and thereby breaking or bursting the minute portions of the latex film bridged over each pore of the dipping form. The deposited latex film, which now contains a multitude of channels or pores communicating with both surfaces of the film, is thereafter processed, as by a procedure which includes repeating the above operation for building up film thickness, stripping the film from the dipping form and trimming, so that the finished product is a marketable article, all as described more specifically hereinafter.

In order that the invention may be more clearly understood, reference is now made to the accompanying drawings in which several embodiments of the invention are illustrated, it being understood that these embodiments are shown by way of illustration to indicate that the invention may be embodied in many different forms.

In the drawings:

Figure 1 is a front view of a suitable dipping form for making a porous girdle;

Figure 2 is a cross sectional view of the form taken along the lines 2—2 of Fig. 3;

Figure 3 is a cross sectional view taken along the lines 3—3 of Fig. 1;

Figure 4 is a greatly enlarged view of a small portion of a flat surface of the form shown in Fig. 1 as indicated by the area 4—4 thereof;

Figure 5 is a cross sectional view of the portion of the form shown in Fig. 4 taken along the lines 5—5 of Fig. 4;

Figure 6 is a greatly enlarged portion of another form of the flat surface shown in Fig. 1;

Figure 7 is a front elevational view of another dipping form that can be used in producing a porous girdle;

Figure 8 is a cross sectional view of the form shown in Fig. 7 taken along the lines 8—8;

Figure 9 is a cross sectional view of the form shown in Fig. 7 taken along the lines 9—9;

Figure 10 is a greatly enlarged view of the portion of the wall of the form shown in Fig. 7 as indicated by lines 10—10 on Fig. 9;

Figure 11 is another embodiment of the type of form shown in Fig. 7;

Figure 12 is a vertical cross sectional view of the form shown in Fig. 11 taken along the lines 12—12;

Figure 13 is the front elevation of the interior of the form shown in Fig. 11 taken along the lines 13—13 in Fig. 12;

Figure 14 is a cross sectional view, similar to Fig. 12, of a form having an outside shape similar to that in Fig. 11, this figure showing an alternate embodiment;

Figure 15 is the front elevation of still another embodiment of a form useful for making a porous girdle;

Figure 16 is a cross sectional view of the form of Fig. 15 taken along the lines 16—16.

An embodiment of a dipping form for preparing a girdle, in accordance with the invention, is indicated generally at 51 in Figs. 1 through 5, inclusive. Form 51 is provided with hook-like supporting members 52 which project from the top of the form and are used to support the form during the dipping process hereinafter described and to hold the form when the girdle is stripped off the form at the conclusion of the dipping process. The form has bosses on both the front and back of the form, such bosses constituting slightly elevated surfaces 53 and 54, respectively, which project upwardly from main article generating surfaces 55 and 56, which function to generate the main surfaces of the girdle, and from subsidiary side generating surfaces 57 and 58, which function to generate the side areas of the girdle, surfaces 55, 57, 56 and 58 being integral portions of the same closed or peripherally complete surface for generating a continuous seamless film. These bosses, which define the reinforced edge of the lower margin of the front and back of the girdle, are provided with substantially perpendicular walls joining the surfaces 53 and 54 and surfaces 55 and 56, respectively, the function and the action of which, in generating a marginal reinforcement during dipping, is clearly set forth in U. S. Patents 2,015,632 and 2,086,481, issued September 24, 1935 and July 6, 1937, respectively, to A. N. Spanel. The bosses have elongated ribbon-like channels 59 and 61 which constitute integral continuations of the main girdle generating surfaces 55 and 56, respectively, and which serve to form the garter tabs of the girdle, all as described more fully in U. S. Patent 2,360,736. The lowermost portions of main generating surfaces 55 and 56 terminate in latitudinally arcuate edges 62 and 63 which define the top of the finished girdle and which cooperate with perpendicular inwardly extending walls joining these edges with the bottom of the form 64 so as to form an edge for trimming as described in the above patents.

In accordance with the embodiment of the invention shown in Figs. 1, 2 and 3, and as shown more clearly in Figs. 4 and 5, a multitude of blind pores, cavities, holes or follicles 65 are positioned uniformly over most of the plane surfaces 55 and 56 of form 51, the distribution of cavities 65 being coextensive with the distribution of the pores in the girdle. These cavities effect an essential step in the formation of the girdle by trapping air during the dipping process, which air thereafter is expanded, as by heating, with the result that it breaks, bursts or presses open the wet film of rubber latex which has bridged across the mouth of the cavity during the dipping process, thus forming a pore, hole or opening in the film of latex deposited on the form. Because of the critical function of these cavities, their dimensions are carefully selected and correllated with the dipping conditions, including the rate or speed at which the dipping form is removed from the bath, the concentration of solids in the rubber latex, the viscosity and particularly the surface tension of latex employed, so that a film of latex bridges over each cavity. The cavities should not be so wide that a substantial amount of latex runs into and fills up the holes. On the other hand, if the cavities are too small or shallow, the volume of air trapped is insufficient to exert enough pressure to break the bridging film during the subsequent expansion of the gas in the cavity by internal heating of the form. Diameters (or widths where square holes are formed) that are effective are in the range of about 10 to 100 thousandths of an inch, about 15 to 40 thousandths being substantially effective; an effective depth for the smaller cavities is of the order of 20 thousandths of an inch and depends upon the viscosity of the latex while generally the larger holes can be about as deep as they are wide.

The cavities in form 51 can be impressed, embossed or drilled in the surface of the form by methods familiar to those skilled in the art of processing metals. For example, a solid cast or rolled slab, sheet or plate of aluminum, magnesium or a similar metal that is malleable or deformable enough to be impressed by rolling, is substantially inert to the chemicals in the rubber latex bath, and is strong enough, is employed for a rigid backing. Such a plate is supported in a horizontal position, as on a planer, shaper or milling machine bed, and pressed with a circular roll having projecting pins, pegs or nubs, which roll is rolled back and forth over the plate until cavities of the desired depth are formed. Such a roll is advantageously made by milling a cylinder of steel so as to form rows of rectangular or square pegs or projections which fit the pattern of cavities shown in Fig. 4 and which project from the surface of the cylinder a somewhat greater distance than the desired depth of the cavities. Alternatively, the roll can be made by the somewhat time consuming process of drilling holes in a cylinder and inserting round pegs or nubs, so that the pegs project from the surface. Similarly other forms of rolls can be used, such as rolls having hexagonal or octagonal pegs, and, in general, any polygonal shape. After blind cavities of the proper depth have been formed in the plate, it is turned over and milled out to form steam or hot water passageways or channels 66, as shown in Fig. 3. Such passageways communicate with an entrance manifold or channel 67 and an exit manifold or channel 68. A second plate for the back of the form is similarly impressed with cavities and milled out to form channels and passageways.

The two plates are then assembled with their channel sides facing each other and separated by a gasket 69, such as a sheet of incompletely cured rubber, which can be cured after assembly, or other appropriate gasket materials. The slabs are thereafter screwed or pinned together in a manner such that the surface of the finished form is continuous, such as by countersinking the screws, welding over the screw holes, and milling or grinding the weld to a smooth surface. The form is thereafter fitted with pipes or tubes 71 and 72 which communicate respectively with the entrance and exit manifolds 67 and 68. Tubes 71 and 72 are fitted with connections (not shown) which can be screwed by nuts 73 and 74 to connections on pipes from hot water and to disposal means therefor, respectively. Passageways 66 and channels 67 and 68 accordingly constitute means for internally heating the form.

Form 51 is employed, in accordance with an aspect of the present invention, in generating or forming the girdle by immersing the dipping form in a bath of rubber latex, typically a natural latex compounded with vulcanizing agents, with the planes of generating surfaces 55 and 56 perpendicular to the surface of the bath and slowly removing the form, as one example at a constant speed in the range of about 0.1 to 0.5 feet per minute from the bath. This operation forms a thin continuous film over the entire surface of the portion of the form which was immersed in the bath. Essentially all the cavities 65 on both the front and back of the form contain pockets of entrapped air covered by bridging films which are integral portions of the continuous film covering the dipping form. For this operation, rubber latices containing about 55 to 65 percent solids are satisfactory.

It is to be noted that the above described method of forming a film bridging the type of cavity here involved is advantageous in that the surface of the film is perpendicular to the axis of the cavity and the plane of the bridging film is substantially identical with the plane of the mouth of the cavity for both the front and back of the form. As a consequence, the bridging films over all of the cavities are subjected to substantially identical forces or strains and therefore behave in an identical fashion, a factor which is material in achieving uniformity in the finished product. Additionally, the weight of the bridging film acts downwardly so that the force of surface tension, which preserves the bridging film intact until blown, is subjected to a minimum counteracting force. When the bridging films in a latitudinal section are maintained intact until they are all blown or burst simultaneously, a more uniform and stronger product is obtained.

It has been found, in accordance with a particular aspect of the invention, that superior results in respect to the maintenance and establishment of the bridging film and in preventing the latex from running into the cavity are obtained in the dipping operation described above, when the dipping form is made so that the shoulder or edge of the cavity (see 65 in Fig. 4) is sharp rather than rounded (i. e., when the sides of the cavity intersect the main generating surface in a substantially perpendicular relation). It is believed, although this aspect of the invention should not be considered to be limited in scope by any theory, that, when the sides of the cavity are perpendicular to the main generating surface and hence to the film of latex, the force urging the latex inwardly into the cavity is at a minimum.

Conversely, when the cavity is bell shaped with its mouth toward the latex film, the surface of the cavity and the surface of the film meet at an acute angle so that the latex can much more easily creep in and fill the cavity so that there is insufficient air in the ensuing blowing operation.

The form, after removal from the bath of latex, is connected to a source of hot water, steam or other fluid heat transfer media through tube 71 and to a means of disposal of such heat transfer media through tube 72 as quickly as possible. The passage of such heat transfer medium quickly heats the form uniformly in the portions or areas of the form in which there are cavities and hence evenly and quickly heats the walls of such cavities, due to the proximity of the heating channels to the surface of the form and the even distribution of such channels in respect thereto. The walls of the cavities transfer heat to the gas trapped therein so that the gas expands and breaks or bursts the still plastic, flowable or moldable bridging film. The material in the broken film thereafter adjusts itself according to the forces of surface tension both around the hole or pore so formed and in the area surrounding the pore, thereby building up the web-like ribs between the pores at a faster rate than by the normal dipping process.

It has been found that the force of surface tension so controls and molds the shape of the opening in the film of latex that a round hole is often formed even when square mouthed cavities are used, particularly if the film is built up to a thickness of about 20 thousandths of an inch or more. Because the periphery of the pore formed by the above process is smooth and continuous, it resists tearing to a much greater extent than does a cut or perforated hole whose periphery necessarily contains minute nicks or cuts in arising from the inevitable irregularity of a perforating device. Because of the tear resistance of the holes formed in this fashion, the girdle of the present invention can advantageously be made with ribs which are not more than about 100 thousandths of an inch wide, thus permitting close spacing of pores and hence excellent ventilation.

After the deposited latex film has dried or solidified to a point where subsequent dipping will not disturb the film, the form is cooled, such as by passing a liquid cooling agent through channels 66 or by allowing the form to cool in a water bath or in the atmosphere, and is subsequently dipped and heated alternately until the desired film thickness, such as a film thickness in the porous area of about 15 to 80 thousandths and preferably about 25 to 50 thousandths of an inch, is built up on the form. The deposited latex film can then be removed from the form, cured and trimmed to yield a girdle or can be processed by any method for producing marketable dipped latex articles. In any event, the film should be treated while still on the form, as by drying and/or partial or complete curing, so that the film can be removed from the form in an unruptured condition. It will be noted that, because of its method of formation, the pores or holes in the finished girdle are much more tear-resistant than if such holes were formed by perforating or cutting a cured continuous film or sheet of rubber, for the reasons noted above. Additionally it has been observed that a porous film formed by the process of the present invention resists further tearing even after the web between the holes is torn, a characteristic which is in sharp contrast to an ordinary film of latex which tends to tear or rip without restraint once a tear is started.

Instead of forming the rigid backing and the cavity-containing surface from a single material as described above, the backing may be made of one material while the surface is made of another and dissimilar material, as shown in Fig. 6. Thus, a metal form 75 of aluminum, stainless steel or the like can be made with means for internal heating as shown in Figs. 1, 2 and 3, including passageways 66, and a smooth outer surface. Thereafter, a cavity-containing surface 76, such as a sheet of high melting or infusible plastic, for example, a melamine resin, nylon and the like, or a glazed ceramic sheet which has been prepared in a mold, can be cemented by known methods to the surface of the metal form, care being taken to form a complete and strong bond and to bevel the edge of the cavity containing surface so that a seamless film of latex is later generated. Similarly, a cavity-containing surface can be built up on the surface of the form by placing a plurality of thin appropriately and uniformly perforated sheets, such as metal sheets, on the form so that the holes of the various sheets are correctly registered with respect to each other. The sheets can be held to each other and to the surface of the form by cements, typically dental cements, or other adhesives or by sandwiching between the sheets perforated sheets of thermoplastic or thermosetting materials, such as nylon or a melamine resin, and thereafter heating and pressing the sandwiched sheets together to form a unitary mass.

Alternatively, the surface of the form can be coated with a plastic, subsequently hardenable material, such as incompletely reacted plastic or synthetic resin, soft rubber gel and the like, the coating impressed to form cavities, as with a roll as described above, and then hardened by completing reaction of the material. In the event that the coating does not adequately retain the impressed cavities, it can be deformed with a flat tool, such as a plate having projecting pegs or nubs, and hardened or reacted with the tool still in contact, the tool being removed after hardening of the coating. In the event that a material is used for the coating which does not yield cavities with sharp shoulders, the cavities can be made deeper than desired so that grinding down the surface of the coating results in sharp shoulders. Somewhat less desirably, the surface can be made of a semi-hard material, such as a wet gel of hard rubber latex, papier-mache and like fibrous materials which are easily impressed and which retain their shape after impression. These impressed surfaces can thereafter be hardened, if necessary, such as by impregnating fibrous surfaces with a liquid plastic or synthetic resin, such as an acrylic resin, which is subsequently polymerized to yield a hard surface. If trouble is encountered with bridging during impregnation, the surface after impregnation can be ground down until the mouths of the cavities are free or the mouths of the cavities can be opened by heating the entrapped air while the impregnating liquid is in a flowable state. When the surface is subsequently hardened, a softer material, such as felt, can be used as the base, particularly if a tool is held against the surface during hardening.

Surface 76 can be conveniently formed of metal by spraying metal, such as aluminum, zinc or tin, on a flat surface, such as a plastic, fibrous or metal surface having projecting pegs or nubs formed as described herein so as to form a negative replica of the surface, which replica is similar to the surface shown in Fig. 5. The back of the replica is then filled for strength and the sheet so formed placed on the dipping form.

Shown in Fig. 7 is an embodiment of a dipping form which can be used for producing a girdle in which the pores extend over substantially all of the body of the girdle, including the sides thereof, except for a narrow band at the top and bottom of the girdle. The form shown in Fig. 7, which is indicated generally by 77, will produce a girdle without garter tabs, which accessories can be produced by modifying form 77 as shown in Fig. 1. Affixed to the top of form 77 are hook-like members 52, which serve the same purpose as similarly numbered members in Fig. 1. Stretched over the surface of form 77 is a sleeve 78 which has holes or pores extending completely therethrough, as shown in Fig. 10, the perforation and function of sleeve 78 being described below.

The top of the form consists of a hollow, preferably metallic, member 79 which can be cast, milled or otherwise formed so as to have a smooth outside surface and a perpendicular ledge or inset member 80 which is coextensive with its lower periphery. Affixed to the outward face of ledge 80, as by cementing with a porcelain cement, and flush with the outer surface of the top 79 is an oval envelope or band 81 of minutely porous material such as unglazed porcelain, sintered fritted glass or adherent but incompletely compacted powdered metal, such as powdered aluminum or iron, formed in the shape shown in Figs. 8 and 9. Porous band 81 is affixed to bottom member 82 of the form, which member can be fabricated by casting, milling or otherwise shaping an appropriate metal, at inset member or ledge 83 thereof. Attached to the top 79 of the form are inlet and outlet fluid conduits 84 and 85, to the upper ends of which are attached connections for joining the conduits to a suitable source of and means for disposal of a gas whose character and use is hereinafter described.

When a gas, such as air, nitrogen and the like, under pressure is introduced into the interior of the form, it passes through porous band 81. By masking the surface of porous band 81 with the sleeve 78, the gas emerging from the interior of the form is guided or channeled into a multitude of small passageways constituted by the openings of sleeve 78 so that the gas can form a like multitude of pores or openings in a film of deposited latex resulting from dipping form 77 in a bath of such latex. The above construction furnishes a contoured form wherein the porous portion is peripherally complete as will be the girdle made thereon. When hot gases, such as hot air, are used, the additional advantage is gained that the hot gas both blows the hole and heats the film in direct heat transfer relationship, thus quickly drying the film, such as preliminary to a subsequent dip.

Sleeve 78 can be a hard rigid material, such as metals, cured hard rubber or a high melting or infusible plastic, as discolsed above, or it can be an elastic stretchable material, such as vulcanized soft rubber, in which case, it has the considerable advantage that the pore forming surface can easily be removed from the form in the event that it is damaged during use. When the sleeve is formed of an elastic material, it is preferably fashioned so that in use it is under tension sufficient to make it fit porous band 81 tightly. Such an elastic sleeve can be advantageously sealed at its upper and lower imperforate edges with a suitable adhesive, such as rubber cement.

When sleeve 78 is composed of rigid material, it can be formed from a master contoured form containing a plurality of openings by placing a plastic film on the master form and treating it in a manner similar to that employed in forming the girdle or the adherent surface described in connection with Fig. 8 (i. e., by blowing air through the plastic film from a multiplicity of orifices and subsequently hardening the film). The hardened film is cut into halves which are then fitted together with considerable precision on form so that there is no gap between them and the pores of the two halves match the regular arrangement employed in the surface as a whole. The master form can advantageously be made slightly larger so that allowance is made for cutting a strip from the sleeve so as to produce the two halves which are later fitted together on form 77.

Alternatively, the sleeve can be made of elastic material, such as rubber, using a cylindrical or conical form having a circumference slightly smaller than the smallest periphery of the form on which it is to be stretched and having apertures or pores in its surface for generating the pores in the sleeve by methods disclosed herein. The elastic sleeve is then stretched over the contoured dipping form. This elastic sleeve may be uncured as placed on the dipping form, in which event it can be subsequently cured in situ, or the sleeve can be made of material, such as vulcanized soft rubber, which remains permanently elastic. Under these conditions the sleeve, when properly prepared of suitable materials, will stretch over the wider portions of the dipping form 77 with only a small diminution in thickness. This procedure provides a method for producing a contoured girdle or sheath from a master form which is not so contoured. It is to be understood that a girdle made on form 77, which is not equipped to generate a trimming edge, as shown, may be so equipped or the girdle, after curing, may be cut, trimmed or clicked so as to shape the upper and/or lower edges to a desired configuration or to create a smooth clean edge. Moreover, any of the dipping forms disclosed herein can be modified so that a porous crotch or band is generated during dipping, such a crotch being integral with and an extension of the middle portions of the front and back lower edges of the girdle.

Shown in Fig. 11 is an alternative dipping form indicated generally at 86 which can be used to produce a girdle similar to that produced on the form of Fig. 7. Stretching over form 86 is a sleeve 87 similar to that shown in Fig. 7 except that sleeve 87, as shown more clearly in Fig. 6, has blind cavities, holes or follicles uniformly distributed over the surface of the sleeve that is on the outside of the dipping form. Sleeve 87 can be made by the methods discussed above, with appropriate modification of the methods so that cavities and not completely open pores are formed. The surface of form 86 is formed by a smooth metal sheet 88 extending completely around the form and affixed, as by welding with subsequent grinding, to top member 89 and bottom member 91 which are shaped as shown, the former having hook-like members 52, the tops of which have been omitted to conserve space on the drawing. Positioned within form 86 adjacent the inner surface of metal sheet 88 and embedded in an insulating material 92, such as cement or Alundum, are two sets of three heating coils 93, 94 and 95, which are positioned or arranged regularly and uniformly adjacent the inner surface of metal sheet 88, as indicated in Fig. 15. These sets of heating coils are connected in parallel with individual leads 96, 97 and 98 to each pair of coils, all of the coils having a common return or bus bar 99. Such individual leads are useful in heating only a section of the dipping form as it emerges from the dipping bath, thus affording extremely good control over the blowing or pore forming operation.

An advantageous method of affixing a sleeve having pores or holes open at both ends to a form is that of placing a layer of plaster or the like, which expands when it sets, between the sleeve and the form, the sleeve preferably being backed with a thin, impenetrable membrane, such as a sheet of polyethylene or the like. By such a technique, the sleeve is bonded to the form in a manner that prevents seepage of the latex between the sleeve and the form and also seals the bottom of the pores. Sealing the bottom of each pore is important because gaseous communication between pores during the blowing process results in malfunction unless the communicating pores blow simultaneously (i. e., the pores are isolated). Alternatively the sleeve can be sealed by placing a bladder between it and the form and inflating the bladder.

Shown in Fig. 14 is an embodiment of a dipping form indicated generally at 101, which has hook-like members 52, the tops of which have been omitted to conserve space in the drawing. Form 101, which has a smooth surface, is equipped with a sleeve 87, formed in a similar fashion to the like numbered sleeve described in connection with Figs. 11 through 13, inclusive. Form 101 is formed so that it has a sealed hollow interior chamber 102 at the bottom of which is an enlarged portion or boiler 103 for containing a volatile liquid 104, such as water, carbon tetrachloride and chlorinated or fluorinated hydrocarbons and other relatively non-flammable liquids having boiling points, at from about 0.5 to 2 atmospheres, of from about 150° to 250° F. Form 101 can be made in two parts consisting of the majority of the form and a top member 105, the liquid placed in the boiler, and then the form sealed, as by welding. In use, the form is dipped into a bath of latex, removed and an induction coil 106 placed around boiler 103 in order to heat the metal thereof. When the temperature of the metal reaches the boiling point of the liquid, it boils up and condenses on the inner surface 107 of the form, thereby heating the form and the walls of the cavities in sleeve 87 so that the air entrapped in the cavities expands and causes the formation of pores in the film of latex. It will be understood by those skilled in the art that the surface of the form itself may be impressed with cavities, for example, in the manner described in connection with Figs. 1 through 5, inclusive, instead of using sleeve 87.

Fig. 15 is an embodiment of a form useful in making a girdle in which the dipping form, indicated generally at 108, is made from two cast and subsequently ground, or otherwise formed, solid slabs, plates or sheets of glass 108a and 108b, between which is cemented a thin layer or sheet 110, as best shown in Fig. 16, of electrically conductive glass or rubber or two flat sheet-like metal electrodes between which is a sheet of material known to heat when these electrodes are employed as the plates of a condenser (i. e., dielectric heating is effected). Electric leads 109 and 111 serve to pass current between outermost boundaries of the electrically conductive layer. Form 108 is drilled near its upper edge so that the U-shaped lowermost portions of hook-like supporting members 112 can be bolted thereto, members 112 serving the same purposes as hook-like members 52 previously described. Blind cavities are created by cavitation in the surface of form 108, which desirably is ground to a flat surface within about a thousandth of an inch, either before or after assembly with the electrically conductive layer. Such cavities are created by using a tool which is made desirably of carbon steel, brass or the like metal and which has square or rectangular nubs projecting from the surface thereof, in a machine which oscillates at very high frequency, such as the machine described in U. S. 2,580,716, issued January 1, 1952, to Lewis Balamuth. The tool is lightly pressed against the surface of form 108 and oscillated at a high frequency while the surface is bathed in a liquid vehicle containing a fine abrasive. As described more fully in the patent, the tool cuts a negative replica of its surface in the surface of a brittle material, such as the glass form referred to, with great precision and desirably forms extremely sharp shoulders (i. e., the peripheries of the mouths of the cavities are defined by intersecting planes) on the cavities generated in the glass form. By carefully shifting the cutting position of the tool over the surface, any desired composite pattern based on the unit pattern of the tool can be created on the surface of the glass slab, such as the pattern shown in Fig. 1.

The above described method of generating cavities by cavitation can also be employed to create cavities in the surface of a porcelain coated metal dipping form similar to those described herein. Thus, a porcelain coating, typically having a thickness of between 20 and 50 thousandths of an inch, can be fired on the surface of a form similar in construction to that described in connection with Figs. 1, 2 and 3 but having a smooth surface to which the porcelain adheres, the coated form thereafter being processed as described. Similarly, sleeves similar to sleeves 87 of the dipping forms of Figs. 11 and 14 can be made of porcelain integrally bonded to metal backing by firing such sleeves having cavities in the surface of the porcelain which have been generated as above described.

Cavities in the surface of a glass surfaced form, such as form 108, can also be generated by employing a special type of glass that can be "chemically machined." Such glass, which is a special composition of silicate glass made photosensitive by the presence of a trace of a silver compound and a sensitizer, is obtainable commercially from the Corning Glass Works at Corning, New York. When the glass is exposed to ultraviolet light and heat treated, it opacifies and becomes very susceptible to attack in the opacified portions by hydrofluoric acid which preferentially eats out or etches these portions. By masking a slab or plate of such glass with a perforated mask or screen having apertures dimensioned and shaped as discussed herein in connection with the size of the pores in the finished girdle, subjecting the masked glass to ultraviolet light, developing small opacified portions in the glass by heating at approximately 1200° F. for about an hour and immersing the cooled, heat treated glass in dilute hydrofluoric acid until the opacified areas are preferentially eaten away, a plate or slab of slightly less than the original thickness and having cavities of the desired dimensions is produced. The cavities are formed in the glass with great precision both as to width and depth and desirably are slightly bottle-necked (with a taper of about 1 in 12). By this method, desired patterns or arrangements of cavities as well as various cross sections of cavities can conveniently be formed by preparing a photographic negative of the proper size from an enlarged representation of the pattern and using the negative as a mask.

Alternately, form 108 may be used without any electrically conductive layer by dipping the form into a bath of latex and forming a continuous film of latex thereon, and quickly transferring the film-covered form to a chamber in which the circumambient atmosphere is at a substantially different pressure than the pressure of the air entrapped in the cavities of the form so that the bridging films are ruptured. Thus the form can be placed in a chamber in which a vacuum of between one to five pounds per square absolute is very rapidly generated or the form can be placed in a pressure chamber and a pressure of from two to ten atmospheres quickly built up. In either event, the difference in pressure causes the gas entrapped in the cavities to change its volume and rupture the bridging film either by inward or outward movement.

It has been discovered, in accordance with a particular aspect of the present invention, that the use of a polygonal cavity or pore which has angular corners, such as the square cavities shown in Fig. 4, results in the highly desirable generation of a nap-like surface on the surface of the girdle which is contiguous to the dipping form during the dipping process. Such a nap-like or felt-like surface, which has the warm friendly feel of fabric rather than the less friendly feel of a smooth rubber film, results from a minor intrusion or running down of the liquid latex into the sharp corners of the pores to form fingers, streamers or tendrils.

As is apparent from the foregoing description, the present invention provides an effective solution to the long unsolved problem of providing adequate ventilation in a rubber latex girdle under conditions that lead to heavy perspiration. The gridle of the present invention is particularly effective in that it affords the greatest ventilation in the areas of greatest stretch where the material of the girdle is in closest proximity to the skin. Additionally, the present invention provides efficient and economical apparatus and methods for fabricating such a girdle.

Although the present invention has been described with particularity with reference to preferred embodiments and various modifications thereof, it will be obvious to those skilled in the art, after understanding the invention, that various changes and other modifications may be made therein without departing from the spirit and scope of the invention and the appended claims should therefore be interpreted to cover such changes and modifications.

We claim as our invention:

1. A form for making porous, sheathlike, deposited latex articles which comprises a rigid backing for maintaining the shape of the form constant during dipping and an article generating surface supported by said backing, a portion of said surface having therein a multitude of small isolated pores bridgeable by liquid rubber latex, and means within said form adapted to be activated to force gas out of said pores.

2. The form of claim 1 characterized in that said pores have sharp shoulders.

3. The form of claim 1 characterized in that said pores have polygonal mouths.

4. A form for making porous, sheathlike, deposited latex girdles which comprises a rigid backing for maintaining the shape of the form constant during dipping and an article generating surface supported by said backing, said form having a contour approximating that of the hip regions of the human body, a substantial portion of said surface having therein a multitude of small isolated cavities bridgeable by liquid rubber latex, and means for internally heating said form.

5. The form of claim 4 characterized in that said backing and said surface are formed of the same material.

6. The form of claim 4 characterized in that said surface is a molded plastic sheet.

7. The form of claim 4 characterized in that said surface is formed by an elastic sleeve stretched over said backing.

8. The form of claim 4 characterized in that said surface is a fibrous material impregnaed with a hardened liquid.

9. The form of claim 4 characterized in that said surface is a hardened gel that has been impressed with cavities while in a soft gel state.

10. A form for making porous, sheathlike deposited latex articles which comprises flat glass plates with an inetgrally bonded electrically conductive heating element therebetween, and electrical leads to oppositely disposed boundaries of said electrically conductive heating element, a substantial portion of the surface of the form having therein a multitude of small blind cavities bridgeable by rubber latex.

11. The form of claim 10 characterized in that said glass is an ultraviolet sensitive glass opacifiable by heat treatment and said cavities are generated by etching opacified small areas of said glass.

12. The form of claim 10 characterized in that such heating element is a sheet of electrically conductive glass.

13. A form for making porous, sheathlike, deposited latex articles which comprises a rigid backing for maintaining the shape of the form constant during dipping and an article generating surface supported by said backing, a substantial portion of said surface having therein a multitude of small isolated cavities bridgeable by liquid rubber latex, said cavities having rectangular mouths each of whose peripheries is defined by intersecting planes.

14. A form for making porous, sheathlike, deposited latex articles which comprises flat glass plates with an integrally bonded electrically conductive heating element therebetween, and electrical leads to said electrically heating element, a substantial portion of the surface of the form having therein a multitude of small blind cavities bridgeable by rubber latex.

15. The form of claim 14 characterized in that said glass is an ultraviolet sensitive glass opacifiable by heat treatment and said cavities are generated by etching opacified small areas of said glass.

16. The form of claim 1 characterized in that said means within said form adapted to be activated to force gas out of said pores comprises means for independently heating the walls of groups of said pores in various transverse portions of said backing.

17. The form of claim 1 characterized in that said article generating surface supported by said backing comprises a sleeve encompassing said backing.

18. The form of claim 1 characterized in that said article generating surface supported by said backing comprises an elastic sleeve encompassing said backing.

19. The form of claim 1 characterized in that said means within said form adapted to be activated to force gas out of said pores comprises a boiler adapted to contain a volatile liquid.

References Cited in the file of this patent
UNITED STATES PATENTS

| | | |
|---|---|---|
| 1,163,053 | Williams | Dec. 7, 1915 |
| 1,193,883 | Emery | Aug. 8, 1916 |
| 1,833,024 | Keen | Nov. 24, 1931 |
| 1,862,633 | Ramsay | June 14, 1932 |
| 1,951,402 | Gammeter | Mar. 20, 1934 |
| 1,983,667 | L'Hollier | Dec. 11, 1934 |
| 2,032,923 | Eldridge | Mar. 3, 1936 |
| 2,032,942 | Linseott et al. | Mar. 3, 1936 |
| 2,053,357 | Winder | Sept. 8, 1936 |
| 2,074,975 | Baatz | Mar. 23, 1937 |
| 2,234,842 | Jordan | Mar. 11, 1941 |
| 2,285,660 | Howland | June 9, 1942 |
| 2,286,117 | Sidnell | June 9, 1942 |
| 2,344,960 | Beal | Mar. 28, 1944 |
| 2,359,948 | Tillotson | Oct. 10, 1944 |
| 2,360,736 | Spanel | Oct. 17, 1944 |
| 2,365,016 | Spanel | Dec. 12, 1944 |
| 2,513,838 | Beal | July 4, 1950 |
| 2,801,445 | Genger et al. | Aug. 6, 1957 |